T. HINTON.
TOOL HOLDER.
APPLICATION FILED FEB. 25, 1919.

1,400,063.

Patented Dec. 13, 1921.

Witnesses
Geo. B. Fleming
Francis Trainor

Inventor
Thomas Hinton
by Bakewell, Byrnes, Parmelee
Attys

UNITED STATES PATENT OFFICE.

THOMAS HINTON, OF READING, ENGLAND, ASSIGNOR TO HERBERT MERTON, OF READING, ENGLAND.

TOOL-HOLDER.

1,400,063.    Specification of Letters Patent.    Patented Dec. 13, 1921.

Application filed February 25, 1919. Serial No. 279,124.

*To all whom it may concern:*

Be it known that I, THOMAS HINTON, a subject of the King of England, residing at Reading, Berkshire, England, have invented certain new and useful Improvements in Tool-Holders, of which the following is a specification.

This invention relates generally to tool-holders and particularly to reamer-holders. A primary object of the invention is to provide an improved tool-holder of the type in which movement is allowed to the tool, for example a reamer, so that it can follow the axis of the bore which is being reamed or otherwise treated, which tool holder shall be of a very simple construction so that it can be made at a low cost.

The invention consists in the construction, arrangement and combination of parts described hereinafter and pointed out in the claims.

One illustrative embodiment of the invention is illustrated by way of example in the accompanying drawing, wherein:—

Figure 1:
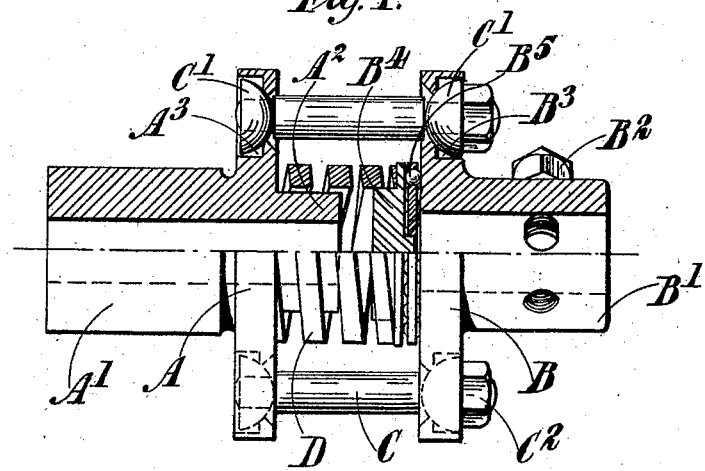
Figure 2:
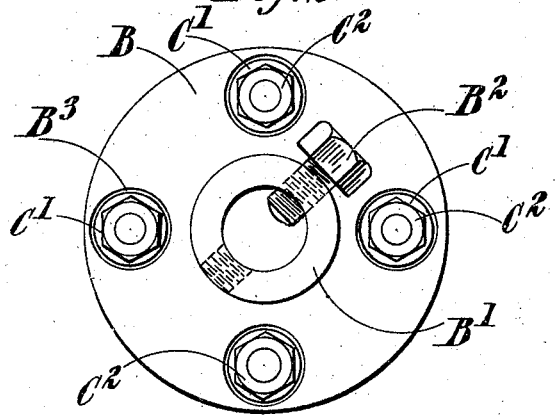

Figure 1 is a longitudinal section through a reamer-holder according to the invention, and Fig. 2 is an end elevation thereof as seen from the reamer-receiving end.

Like reference letters designate like parts in both views.

Referring to the drawing, the supporting-member A in the form of a disk has attached to it a shank $A^1$ for being secured in the turret of a lathe, and a forward projection $A^2$. A chuck-member B also in the form of a disk has a forward projection $B^1$ which is hollow to receive the reamer, and is provided with a set-screw $B^2$ for securing the same in place.

The disks A and B are connected together by links C. Each link has at each end a hemispherical enlarged portion $C^1$. The links lie parallel to each other and the hemispherical ends engage recesses $A^3$ and $B^3$ in the disks A and B. Owing to this construction, the chuck member and supporting member can move rotatably and axially relatively to each other. Preferably, the angle through which the links can swing out of their normal position is sufficiently great to reduce the distance between the two disks by at least $\frac{1}{16}$ part of an inch. The end portions $C^1$ which engage the disk A may be riveted to the links C, but the end portions $C^1$ which engage the disk B may be screwed onto the links and locked by nuts $C^2$.

A spring D operates between the disks A and B to thrust them apart, one end of the spring surrounding the forwardly-projecting portion $A^2$ of the member A and the other engaging a shouldered plate $B^4$ which is connected to the disk B by a ball-bearing $B^5$ to receive the thrust transmitted by the reamer.

The operation of this device is as follows:—

The reamer is mounted in the chuck-member B and the shank $A^1$ of the supporting-member A is mounted in the turret. The reamer is fed up in the usual manner to enter the bore which is to be reamed, and if the reamer is not quite in line with the axis of the bore, it will adjust itself in relation thereto by moving the disk B bodily relatively to the disk A by a parallel movement which is controlled by the links C. It will thus be seen that the reamer is kept parallel although it is moved out of line with its support.

Immediately the reamer commences to cut, a torsion is put on the links, and the angle which they take up will vary according to the size and depth of hole being reamed. Should the reamer "bite in" this initial angle will be increased, and the tool will be automatically withdrawn from the work when such overload occurs.

It will be appreciated that the spring D must be strong enough to keep the disk B at all times forward so that the hemispherical ends of the links are bedded in the receiving recesses of their respective disks, as otherwise tilting of the chuck-member will occur, which will put the reamer out of parallel with the axis of the bore in the work-piece.

Obviously other universal connections could be provided for the ends of the links, but those described are inexpensive to manufacture and accurate in operation.

I am aware that it has been proposed heretofore to provide a tool holder of the type referred to comprising a central driving member engaging square recesses in the inner faces of the supporting member and chuck member. In this known construction, therefore, these members were prevented from turning relatively to one another, and such a driving member and the method adopted of mounting the connecting links, added to the expense of manufacture, and I therefore make no claim to such a tool holder, but I claim:—

1. A tool holder of the character described for use with a support, comprising in combination a supporting member comprising a disk adapted to be secured to said support, a chuck member comprising a disk normally co-axial with said first mentioned disk for receiving a tool, each of said disks having seats in its outer face remote from the other disk, links extending through said disks and having hemispherical portions at each end seated in said seats, said links constituting the sole means for connecting and transmitting rotational movement from the supporting member to the chuck member, and normally extending parallel with the axis common to said members and being free to swing universally each about its point of connection with said members, whereby the chuck and supporting member may have a relative rotary movement and be caused thereby to move axially relatively to each other, and a compression spring between said members tending to thrust the same apart, substantially as and for the purpose set forth.

2. A tool-holder of the character described for use with a support, comprising a disk constituting a supporting member having a shank adapted to be secured to said support, a second disk constituting a chuck member normally co-axial therewith for receiving a tool, and links connecting said members, said links constituting the sole means for transmitting rotational movement from the supporting member to the chuck member, and normally extending parallel with the axis common to said members and being free to swing universally each about its points of connection with said members through an angle out of its normal position sufficiently great to reduce the distance between the two disks by at least one-sixteenth part of an inch, substantially as described.

3. A tool-holder of the character described for use with a support, comprising a disk constituting a supporting member having a shank adapted to be secured to said support, a second disk constituting a chuck member normally co-axial therewith for receiving the tool, a compression spring located between said disks and tending to force the same apart, and links connecting said members, said links constituting the sole means for transmitting rotational movement from the support member to the chuck member, and normally extending parallel with the axis common to said members and being free to swing universally each about its point of connection with said members whereby the chuck and supporting member may have a relative rotary movement and be caused thereby to move axially relatively to each other, which spring is sufficiently strong to counter-balance the end thrust of the tool against the work, substantially as described.

In testimony whereof I have signed my name to this specification in the presence of two subscribing witnesses.

THOMAS HINTON.

Witnesses:
HARRY L. LEIDGE,
FRANK MOORE.